US011922543B2

(12) United States Patent
Park et al.

(10) Patent No.: US 11,922,543 B2
(45) Date of Patent: Mar. 5, 2024

(54) DEVICE AND METHOD FOR COLORING SKETCH IMAGE WITH COLOR POINTER

(71) Applicant: NAVER WEBTOON LTD., Seongnam-si (KR)

(72) Inventors: Jun Hyun Park, Seongnam-si (KR); Yu Ra Shin, Seongnam-si (KR); Du Yong Lee, Seongnam-si (KR); Joo Young Moon, Seongnam-si (KR)

(73) Assignee: NAVER WEBTOON LTD., Seongnam-si (KR)

( * ) Notice: Subject to any disclaimer, the term of this patent is extended or adjusted under 35 U.S.C. 154(b) by 129 days.

(21) Appl. No.: 17/648,211

(22) Filed: Jan. 18, 2022

(65) Prior Publication Data

US 2022/0139000 A1    May 5, 2022

Related U.S. Application Data

(63) Continuation of application No. PCT/KR2020/009368, filed on Jul. 16, 2020.

(30) Foreign Application Priority Data

Jul. 18, 2019    (KR) .................. 10-2019-0087093

(51) Int. Cl.
 *G06T 11/00*     (2006.01)
 *G06F 3/0482*    (2013.01)
 *G06F 3/04845*   (2022.01)

(52) U.S. Cl.
CPC .......... *G06T 11/001* (2013.01); *G06F 3/0482* (2013.01); *G06F 3/04845* (2013.01); *G06T 2200/24* (2013.01)

(58) Field of Classification Search
CPC ...................................... G06T 11/001
USPC ........................................... 345/165
See application file for complete search history.

(56) References Cited

U.S. PATENT DOCUMENTS

| 5,613,056 A * | 3/1997 | Gasper ................. G11B 27/10 |
| | | 704/E21.02 |
| 7,907,763 B2 | 3/2011 | Matsumoto |
| 8,593,477 B2 | 11/2013 | Furukawa et al. |
| 2005/0226530 A1 | 10/2005 | Murayama |
| 2013/0257896 A1* | 10/2013 | Nishiyama ............... H04N 1/56 |
| | | 345/173 |

(Continued)

FOREIGN PATENT DOCUMENTS

| JP | 03224076 A | 10/1991 |
| JP | 2003224734 A | 8/2003 |
| JP | 2005301492 A | 10/2005 |

(Continued)

OTHER PUBLICATIONS https://www.youtube.com/watch?v=z9Ln7KlmhQg; Jun. 6, 2018.

(Continued)

*Primary Examiner* — Long D Pham
(74) *Attorney, Agent, or Firm* — Greer Burns & Crain Ltd.

(57) ABSTRACT

A method, performed by a coloring apparatus, of coloring a sketch image includes adding a color pointer on the sketch image, according to an input of a user; determining an object related to a point where the color pointer is located, from among objects configuring the sketch image; and generating a colored image by coloring the determined object, based on a color of the color pointer.

14 Claims, 12 Drawing Sheets

(56) References Cited

U.S. PATENT DOCUMENTS

2014/0176566 A1   6/2014  Cho

FOREIGN PATENT DOCUMENTS

| | | |
|---|---|---|
| JP | 2008059540 A | 3/2008 |
| JP | 4130457 B2 | 8/2008 |
| JP | 2009199134 A | 9/2009 |
| JP | 2009211237 A | 9/2009 |
| JP | 2009272665 A | 11/2009 |
| KR | 1020080046907 A | 5/2008 |
| WO | 2008010707 A1 | 1/2008 |
| WO | 2009104331 A1 | 8/2009 |

OTHER PUBLICATIONS

Office action issued in corresponding Korean patent application No. 19-87093, dated Sep. 28, 2020.
Notice of allowance issued in corresponding Korean patent application No. 19-87093, dated Feb. 15, 2021.
ISR issued in PCT/KR2020/009368, dated Oct. 13, 2020.
Office action issued in corresponding Japanese patent application No. 2022-502292, dated Feb. 7, 2023.

* cited by examiner

DEVICE AND METHOD FOR COLORING SKETCH IMAGE WITH COLOR POINTER

CROSS-REFERENCE TO RELATED APPLICATIONS

This is a continuation application of International Application No. PCT/KR2020/009368, filed Jul. 16, 2020, which claims the benefit of Korean Patent Application No. 10-2019-0087093, filed Jul. 18, 2019.

BACKGROUND OF THE INVENTION

Field of Invention

The disclosure relates to the field of image processing. More particularly, the disclosure relates to an apparatus and a method for coloring a sketch image.

Description of Related Art

In the past, users consumed cartoons offline through comic books and the like, but with the recent development of the Internet, a tendency to consume cartoons online through webtoons and the like is increasing. Comic books mostly consist of black and white images due to issues such as printing and the like, but webtoons are mostly provided in color images according to the development of a network speed and a resolution of a user device.

Webtoon producers generate a sketch image that is not colored via a sketch work and then color the sketch image with colors they want, and there is still no program or service for easily coloring sketch images.

BRIEF SUMMARY OF THE INVENTION

An apparatus and a method for coloring a sketch image, according to an embodiment, are for quickly coloring a sketch image via an easy method.

Also, an apparatus and a method for coloring a sketch image, according to an embodiment, are for generating a colored image of desired quality via a history management function of colored images.

A method of coloring a sketch image, according to an embodiment of the disclosure, includes: adding a color pointer on the sketch image, according to an input of a user; determining an object related to a point where the color pointer is located, from among objects configuring the sketch image; and generating a colored image by coloring the determined object, based on a color of the color pointer.

According to an apparatus and a method for coloring a sketch image, according to an embodiment, a sketch image can be quickly colored via an easy method.

Also, according to the apparatus and the method for coloring a sketch image, according to an embodiment, a colored image of desired quality can be generated via a history management function of colored images.

However, effects achievable by the apparatus and the method for coloring a sketch image, according to an embodiment, are not limited to those mentioned above, and other effects that are not mentioned could be clearly understood by one of ordinary skill in the art from the following description.

BRIEF DESCRIPTION OF THE DRAWINGS

A brief description of each drawing is provided to better understand the drawings cited herein.

DETAILED DESCRIPTION OF THE INVENTION

A method of coloring a sketch image, according to an embodiment of the disclosure, includes: adding a color pointer on the sketch image, according to an input of a user; determining an object related to a point where the color pointer is located, from among objects configuring the sketch image; and generating a colored image by coloring the determined object, based on a color of the color pointer.

A coloring apparatus according to another embodiment of the disclosure includes: a processor; and a memory storing at least one instruction, wherein the processor is configured to, according to the at least one instruction: add a color pointer on the sketch image, according to an input of a user; determine an object related to a point where the color pointer is located, from among objects configuring the sketch image; and generate a colored image by coloring the determined object, based on a color of the color pointer.

As the disclosure allows for various changes and numerous examples, particular embodiments will be illustrated in the drawings and described in detail in the written description. However, this is not intended to limit the disclosure to particular modes of practice, and it will be understood that all changes, equivalents, and substitutes that do not depart from the spirit and technical scope of the disclosure are encompassed in the disclosure.

In the description of embodiments, certain detailed explanations of related art are omitted when it is deemed that they may unnecessarily obscure the essence of the disclosure. Also, numbers (for example, a first, a second, and the like) used in the description of embodiments are merely identifier codes for distinguishing one element from another.

Also, in the present specification, it will be understood that when elements are "connected" or "coupled" to each other, the elements may be directly connected or coupled to each other, but may alternatively be connected or coupled to each other with an intervening element therebetween, unless specified otherwise.

In the present specification, regarding an element represented as a "unit" or a "module", two or more elements may be combined into one element or one element may be divided into two or more elements according to subdivided functions. In addition, each element described hereinafter may additionally perform some or all of functions performed by another element, in addition to main functions of itself, and some of the main functions of each element may be performed entirely by another component.

Hereinafter, embodiments of the disclosure will be described in detail.

Figure 1:
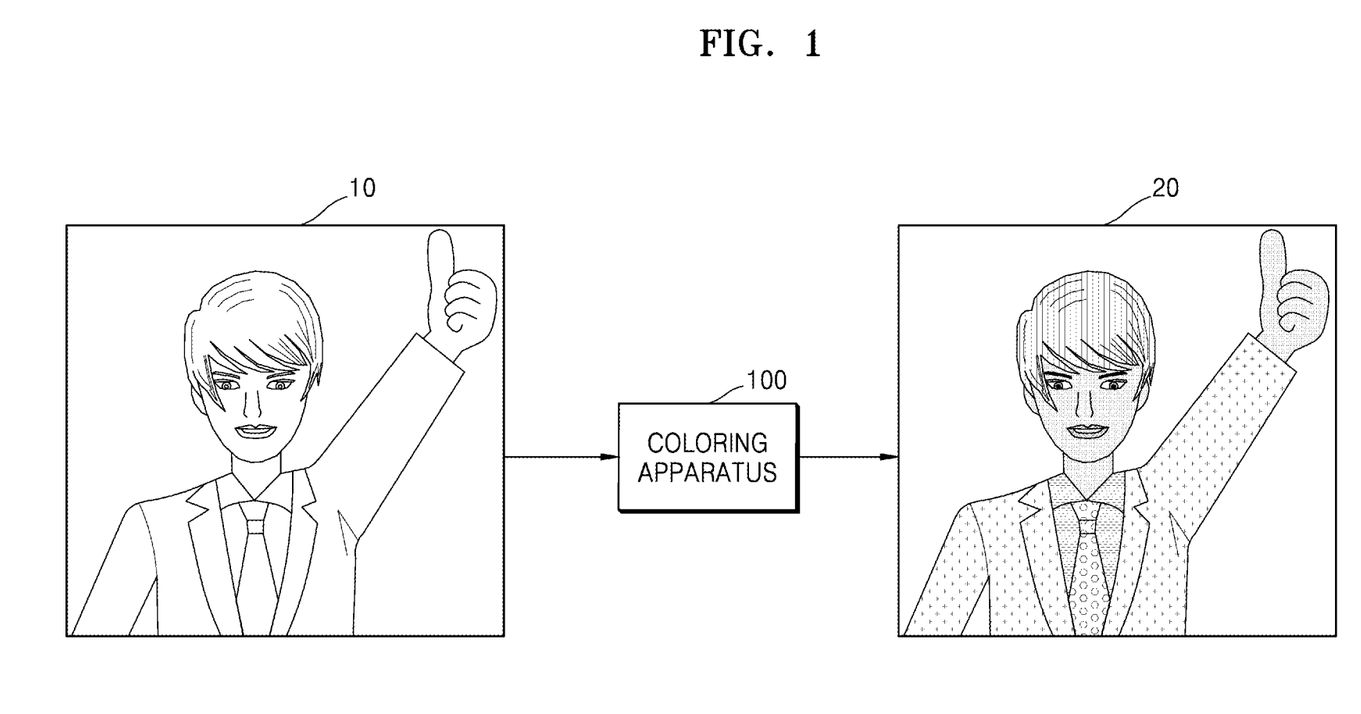
FIG. 1 is a diagram showing a coloring apparatus according to an embodiment.

FIG. 1 is a diagram showing a coloring apparatus 100 according to an embodiment.

The coloring apparatus 100 according to an embodiment generates a colored image 20 by coloring a sketch image 10. A user may determine a color for coloring the sketch image 10, via a user interface (UI) screen described below.

The coloring apparatus 100 may learn a coloring method, based on artificial intelligence (AI), so as to generate the colored image 20 of high quality. For example, the coloring apparatus 100 may learn a method of coloring objects configuring an image, based on image coloring training, and color an object included in the sketch image 10, based on the learned method, a color and a location of the corresponding color selected by the user. In other words, according to an embodiment, there may be no need for the user to personally color the objects of the sketch image 10 with a certain color. The coloring apparatus 100 may generate the colored image 20 of high quality, based on a pre-learned method, only by the user selecting a color and a location of the color.

The coloring apparatus 100 according to an embodiment may be a user terminal. The user terminal may include various types of devices capable of performing image processing, for example, a smart phone, a tablet personal computer (PC), a laptop computer, a desktop PC, and the like. A program for coloring the sketch image 10 may be installed in the user terminal. The user terminal may obtain the sketch image 10 selected by the user and color the obtained sketch image 10. The user terminal may display, on a display, the colored image 20 generated from the sketch image 10. Also, the user terminal may display, on the display, a UI screen for coloring the sketch image 10.

According to another embodiment, the coloring apparatus 100 may be a server communicating with the user terminal. The server may receive the sketch image 10 from the user terminal or receive the sketch image 10 from another apparatus connected via a network, and color the received sketch image 10. The server may transmit the colored image 20 to the user terminal. Also, the server may transmit a UI screen for coloring the sketch image 10 to the user terminal.

Hereinafter, operations of the coloring apparatus 100 will be described in detail with reference to FIG. 2.

Figure 2:
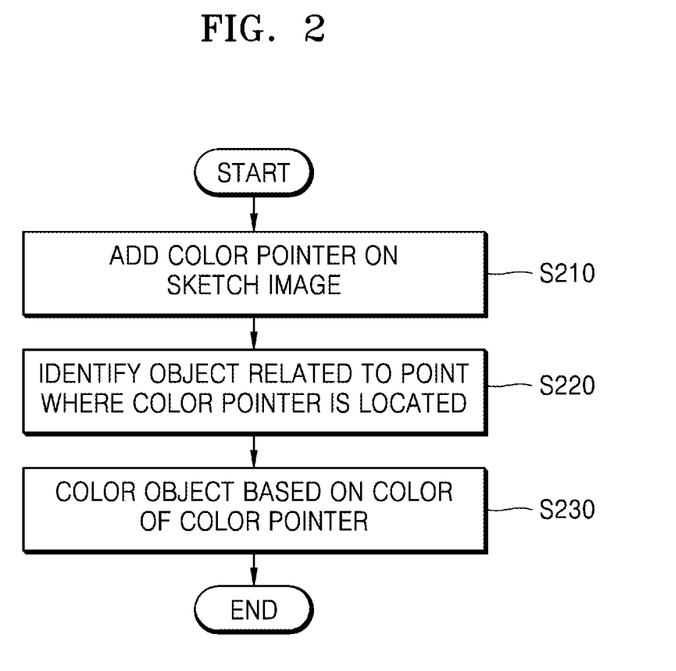
FIG. 2 is a flowchart for describing a method by which a coloring apparatus colors a sketch image, according to an embodiment.

FIG. 2 is a flowchart for describing a method by which the coloring apparatus 100 colors a sketch image, according to an embodiment.

In operation S210, the coloring apparatus 100 adds a color pointer on the sketch image, according to a user input. According to an embodiment, a user may select a color to be used to color the sketch image, and select a point where the color pointer is to be located on the sketch image. The coloring apparatus 100 may locate the color pointer of the color selected by the user at the point selected by the user.

The color pointer added on the sketch image may be a color pointer of a first type. For example, the color pointer of the first type may include a first figure of a color selected by the user and a second figure of a pre-determined color, and will be described below with reference to FIG. 4.

In operation S220, the coloring apparatus 100 determines an object related to a point where the color pointer is located from among objects configuring the sketch image.

The sketch image may include several objects. The object denotes a partial region of the sketch image. The objects may be distinguished from each other. For example, when the sketch image expresses a person, the objects may be hair, skin, upper garment, lower garment, and the like of the person. As another example, when the sketch image expresses a vehicle, the objects may be a windshield, a wheel, a license plate, a panel, and the like of the vehicle. As another example, the object may be a closed region surrounded by a line.

The coloring apparatus 100 may identify the objects configuring the sketch image to be colored. For example, the objects configuring the sketch image may be identified according to an object identification method pre-learned based on AI.

According to an embodiment, the object related to the point where the color pointer is located may include an object including the point where the color pointer is located, from among the objects configuring the sketch image. For example, when the sketch image indicates a person and the color pointer is located in a face object of the person, the coloring apparatus 100 may determine the face object as the object related to the color pointer. Also, for example, when the color pointer is located in the face object of the person, the coloring apparatus 100 may determine, as the object related to the color pointer, the face object, and a neck object and a hand object corresponding to the skin of the person.

According to another embodiment, the coloring apparatus 100 may determine, as the object related to the color pointer, an object closest to the point where the color pointer is located or an object located within a certain distance from the point where the color pointer is located, from among the objects configuring the sketch image.

In operation S230, the coloring apparatus 100 generates a colored image by coloring the object determined in operation S220, based on a color of the color pointer.

For example, the coloring apparatus 100 may color the object with the color of the color pointer.

As another example, when a pre-set color is present in relation to the object determined in operation S220, the object may be colored by using the pre-set color and the color of the color pointer. This may be useful when a color familiar to people is present, such as an object corresponding to skin. For example, when a red color pointer is located at a face object, the coloring apparatus 100 may color the face object by mixing red, that is a color of the color pointer, with a color pre-set with respect to the face object.

The coloring apparatus 100 may color the object with the color of the color pointer and/or the color pre-set with respect to the object, according to a coloring method pre-learned based on training colored images. In other words, when a location of a shade of a certain object, brightness of a color, and the like are determined as the pre-learned coloring method, the coloring apparatus 100 may color the object with the color of the color pointer and/or the color pre-set with respect to the object, considering the pre-determined location of the shade and brightness.

As described above, the user may color the sketch image via a UI screen, which will be described below with reference to FIGS. 3 through 11.

Figure 3:
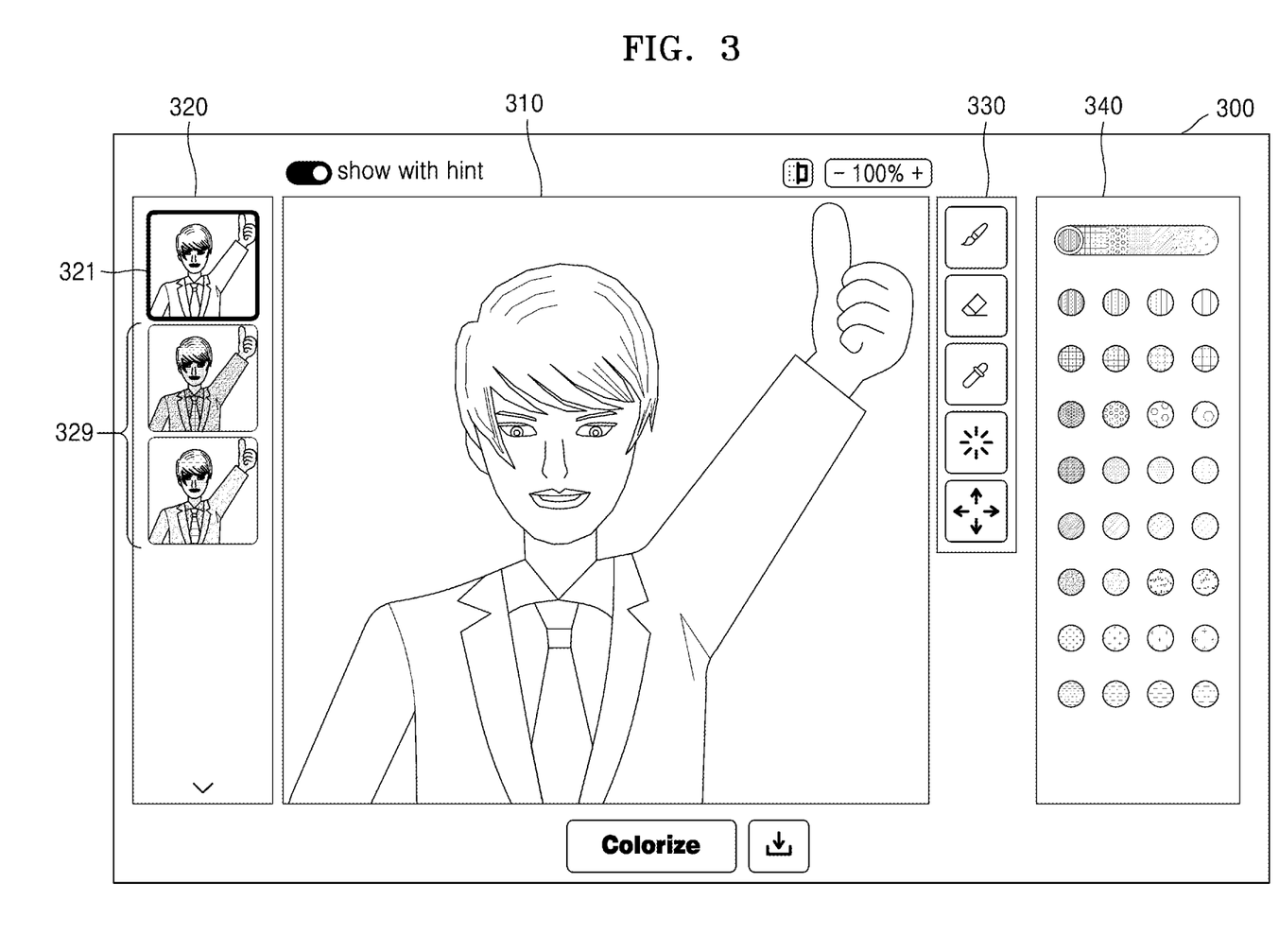
FIG. 3 is an exemplary diagram showing a user interface (UI) screen for coloring a sketch image.

FIG. 3 is an exemplary diagram showing a UI screen 300 for coloring a sketch image.

The coloring apparatus 100 may generate the UI screen 300 for receiving user manipulation for coloring the sketch image. For example, when the coloring apparatus 100 is a user terminal, the user terminal may generate the UI screen 300 and display the same on its display. Alternatively, when the coloring apparatus 100 is a server, the server may generate the UI screen 300 and transmit the same to the user terminal, and the user terminal may display the received UI screen 300 its display.

When a user selects the sketch image to be colored, the UI screen 300 as shown in FIG. 3 may be generated by the coloring apparatus 100.

Referring to FIG. 3, the UI screen 300 may include a sketch image 310 to be colored, a history panel 320, a tool menu 330, and a color swatch 340. In FIG. 3, the sketch image 310, the history panel 320, the tool menu 330, and the color swatch 340 are located in different regions on the UI screen 300, but this is only an example. For example, the tool menu 330 may be located on the sketch image 310, and may not be displayed when there is no certain input of the user and may be displayed on the UI screen 300 only when there is the certain input of the user.

The sketch image 310 may be displayed, on the UI screen 300, in a pre-determined size regardless of the resolution of the sketch image 310. For example, when the pre-determined size is 200 mm in length and 300 mm in width, the sketch image 310 may be displayed, on the UI screen 300, always in the size of 200 mm in length and 300 mm in width, regardless of the resolution of the sketch image 310.

The history panel 320 includes a plurality of thumbnail images 321 and 329. In detail, the history panel 320 may include the thumbnail image 321 of the sketch image 310 and the thumbnail image 329 of a sample colored image corresponding to the sketch image 310. The coloring apparatus 100 may generate the sample colored image obtained by coloring the sketch image 310 selected by the user according to a pre-stored coloring method, and add the thumbnail image 329 thereof to the history panel 320. As will be described below, the user may select the thumbnail image 329 corresponding to the sample colored image, and generate a colored image by changing the sample colored image.

The tool menu 330 may include menus used to color the sketch image 310. For example, the tool menu 330 may include a color pointer addition menu, a color pointer deletion menu, a color extraction menu, and the like, and such menus will be described below in related sections.

The color swatch 340 is used to assign a color of a color pointer. The user may determine the color of the color pointer via the color swatch 340. The user may select one color from among the color samples illustrated in the color swatch 340, or select the color of the color pointer by directly inputting a red, green, blue (RGB) value.

Figure 4:
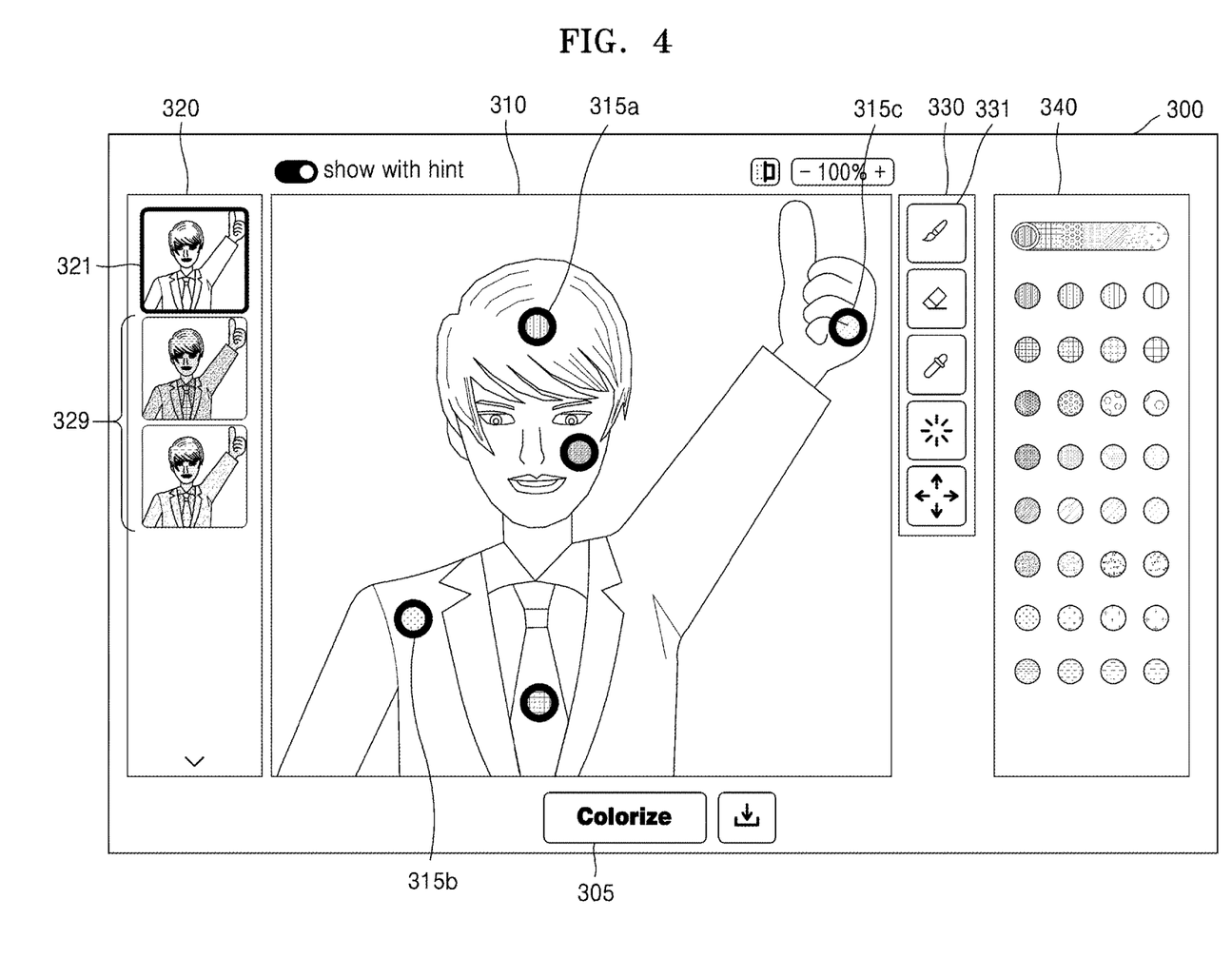
FIG. 4 is an exemplary diagram showing a UI screen including a color pointer located on a sketch image.

FIG. 4 is an exemplary diagram showing the UI screen 300 including color pointers 315a, 315b, 315c, and the like located on the sketch image 310.

According to an embodiment of the disclosure, the user may easily color the sketch image 310 only by simply adding the color pointers 315a, 315b, 315c, and the like on the sketch image 310, without having to directly color the sketch image 310 by using a mouse or the like. In detail, the user may select a desired color from the color swatch 340, select a color pointer addition menu 331 of the tool menu 330 via a method, such as a mouse click, a touch, or the like, and then select points where the color pointers 315a, 315b, 315c, and the like are to be added. The color pointers 315a, 315b, 315c, and the like of colors selected by the user may be located at the points selected by the user.

As shown in FIG. 4, the user may locate the color pointers 315a, 315b, and 315c at a hair object, an upper garment object, and a glove object of the sketch image 310. The color pointers 315a, 315b, 315c, and the like added on the sketch image 310 may be color pointers of a first type. For example, a color pointer of the first type may include a first figure of a color selected by the user and a second figure of a pre-determined color. As shown in FIG. 4, the first figure may have a circular shape and the second figure may have a donut shape, but they are not limited thereto. The color pointer of the first type may be distinguished from a color pointer of a second type and a color pointer of a third type.

Figure 5:
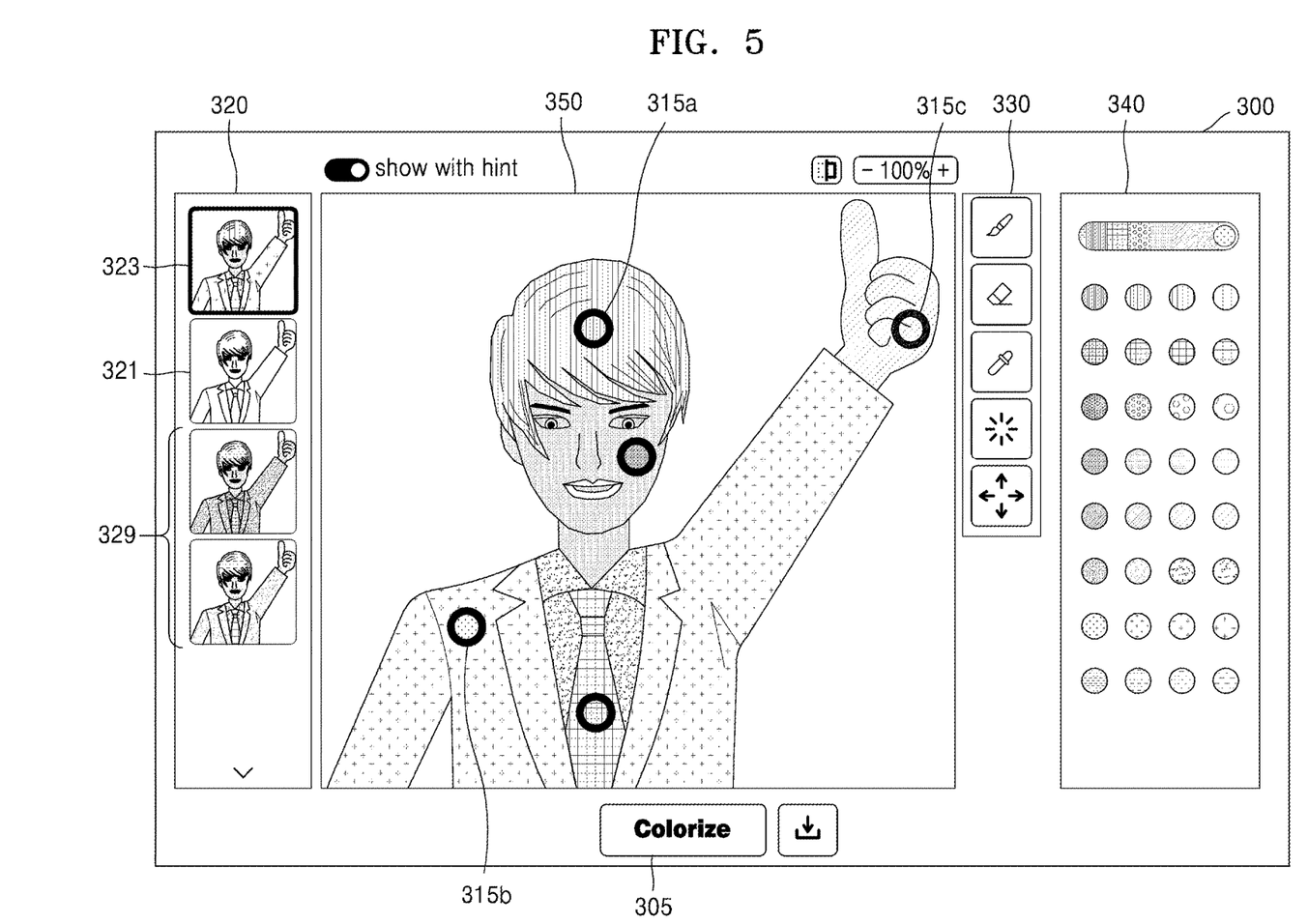
FIG. 5 is an exemplary diagram showing a UI screen including a colored image colored based on a color pointer.

The UI screen 300 when the addition of the color pointers 315a, 315b, 315c, and the like is completed by the user and an application menu 305 is selected by the user is illustrated in FIG. 5.

FIG. 5 is an exemplary diagram showing the UI screen 300 including a colored image 350 colored based on the color pointers 315a, 315b, 315c, and the like.

As described above, the coloring apparatus 100 may determine objects related to the points where the color pointers 315a, 315b, 315c, and the like are located, and generate the colored image 350 by coloring the determined objects based on the colors of the color pointers 315a, 315b, 315c, and the like. When the user selects the application menu 305, the colored image 350 may be generated and at the same time, a thumbnail image 323 of the colored image 350 may be added to the history panel 320. In other words, the history panel 320 may sequentially include thumbnail images of colored images generated according to manipulation of the user, according to generated times.

Referring to FIG. 5, the colored image 350 generated according to selection of the application menu 305 by the user, and the color pointers 315a, 315b, 315c, and the like added with respect to the colored image 350 may be displayed on the UI screen 300.

The user may modify the colored image 350. For example, the user may select a thumbnail image corresponding to one colored image from among the thumbnail images included in the history panel 320, and modify the colored image corresponding to the selected thumbnail image. A process of modifying the colored image will be described with reference to FIGS. 6 through 8.

Figure 6:
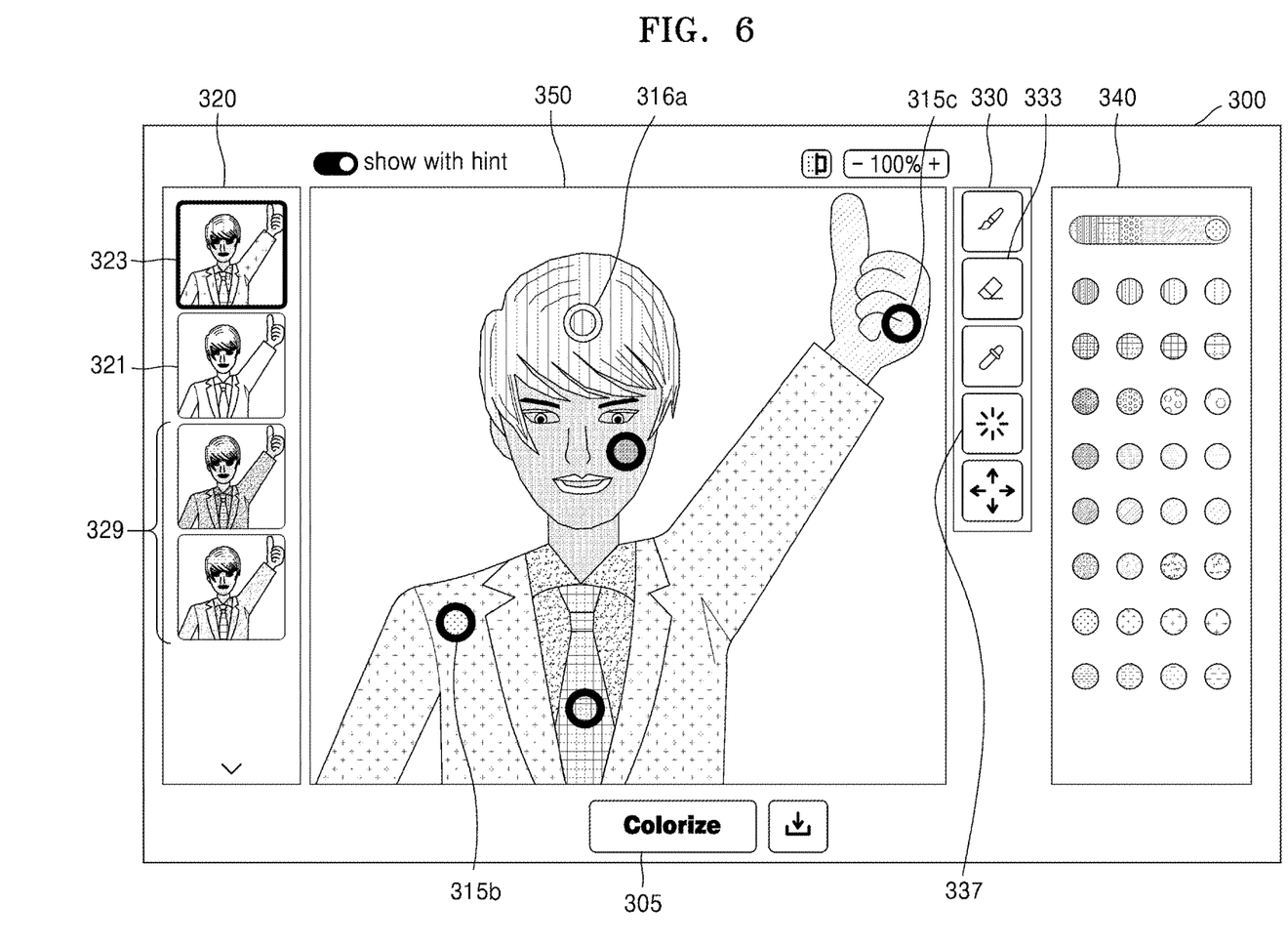
FIG. 6 is an exemplary diagram showing a UI screen including a color pointer of a second type corresponding to a color pointer deletion request.

FIG. 6 is an exemplary diagram showing the UI screen 300 including a color pointer 316a of a second type corresponding to a color pointer deletion request.

To modify the pre-generated colored image 350, the user may delete a color pointer (for example, the color pointer 315a) added previously. In detail, the user may select a color pointer deletion menu 333 from the tool menu 330, and then select the color pointer (for example, the color pointer 315a) added previously. Accordingly, the color pointer (for example, the color pointer 315a) of the first type selected by the user may be changed to the color pointer of the second type. For example, the color pointer 316a of the second type may include the first figure in which transparency is adjusted and the second figure in which transparency is adjusted. In other words, the color pointer 315a of the first type, which has been added previously, may be distinguished from another color pointer by being changed to the color pointer 316a of the second type, in which the transparency is adjusted, when the user requests deletion.

Also, the user may select a delete all menu 337 from the tool menu 330 to delete all color pointers 315*a*, 315*b*, 315*c*, and the like added previously.

Figure 7:
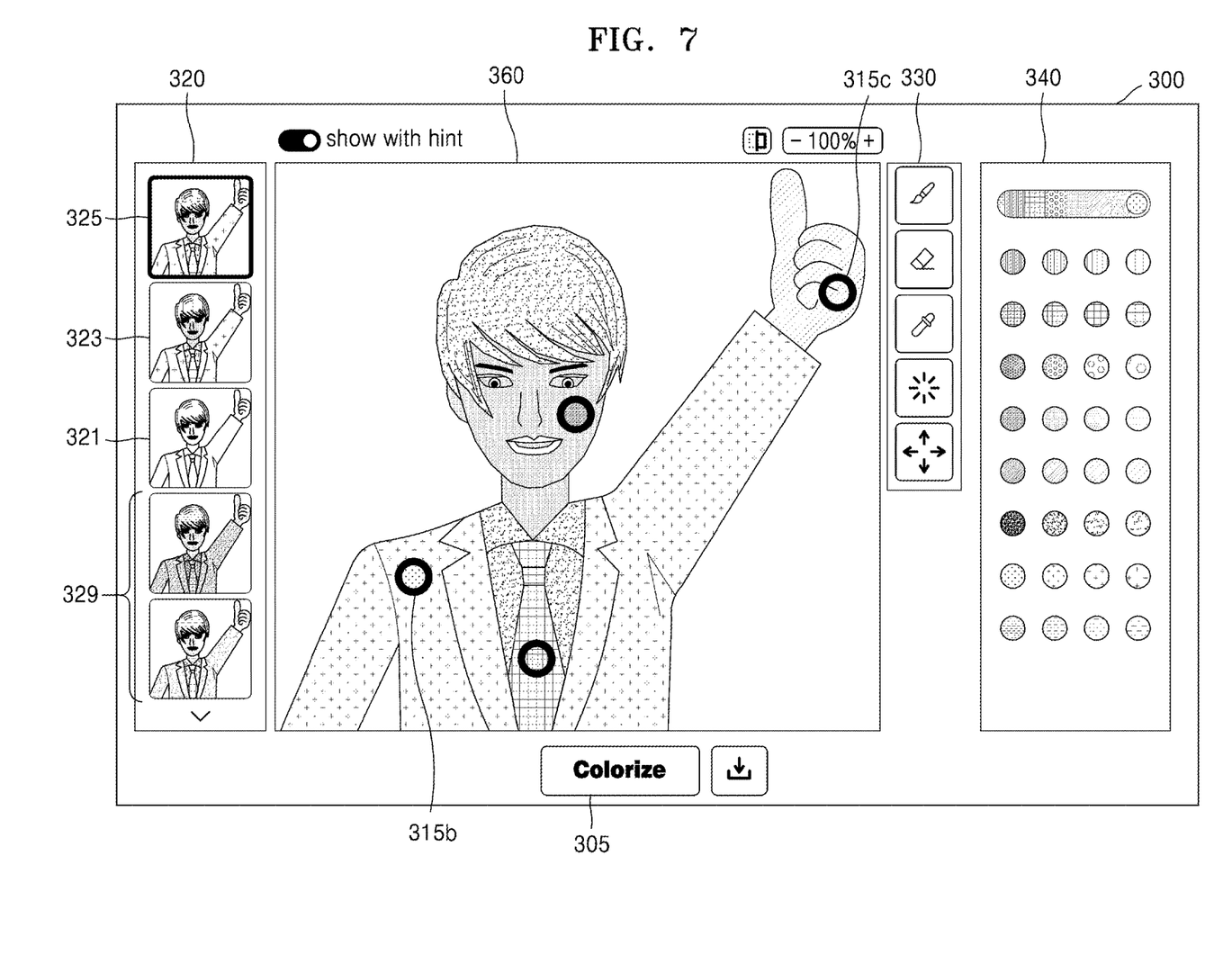
FIG. 7 is an exemplary diagram showing a UI screen including a colored image changed as a color pointer is deleted.

The UI screen 300 when the application menu 305 is selected after the user has deleted the color pointer 315*a* added to the hair object is illustrated in FIG. 7.

FIG. 7 is an exemplary diagram showing the UI screen 300 including a colored image 360 changed as the color pointer 315*a* is deleted.

As shown in FIG. 7, the pre-generated colored image 350 is changed to the new colored image 360, and a thumbnail image 325 of the new colored image 360 may be added to the history panel 320. The new colored image 360 is generated based on the color pointers 315*b*, 315*c*, and the like, excluding the color pointer 315*a* deleted in FIG. 6.

Figure 8:
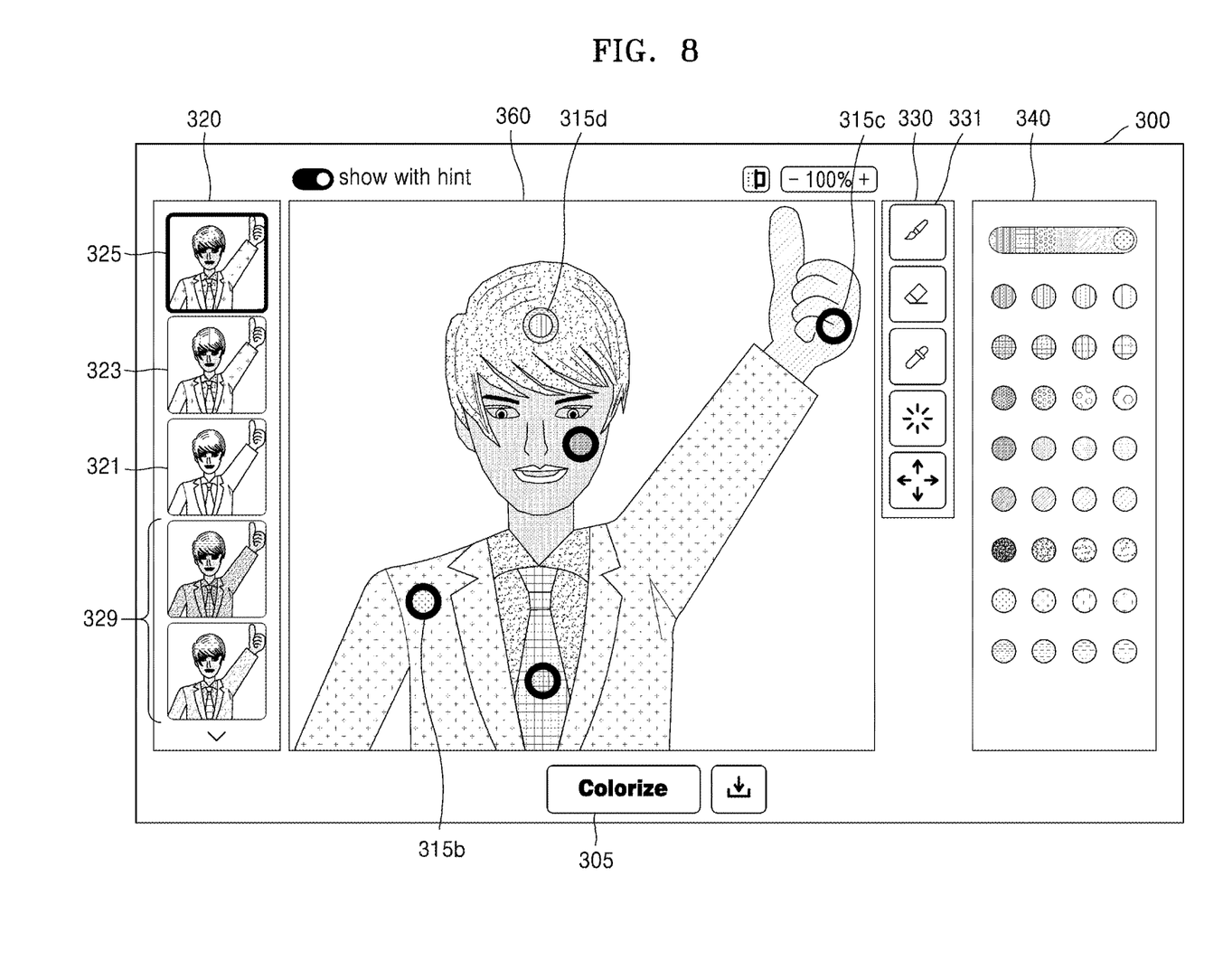
FIG. 8 is an exemplary diagram showing a UI screen including a color pointer of a third type added on a colored image.

FIG. 8 is an exemplary diagram showing the UI screen 300 including a color pointer 315*d* of a third type added on the colored image 360.

The user may add a new colored image to a pre-generated colored image. Referring to FIG. 8, the user may select the color pointer addition menu 331 from the tool menu 330, select a desired color from the color swatch 340, and select a point where a color pointer is to be added, thereby adding the new color pointer 315*d* on the colored image 360. Here, the color pointer 315*d* added on the colored image 360 may have the third type. For example, the color pointer 315*d* of the third type may include the first figure of a color selected by the user and the second figure of a pre-determined color. The color of the second figure included in the color pointer 315*d* of the third type may be different from the color of the second figure included in the color pointer of the first type described above. Accordingly, the color pointer 315*d* of the third type may be distinguished from a color pointer of the first type and a color pointer of the second type.

When there are a plurality of pre-generated colored images, the user may select a thumbnail image of one colored image from the history panel 320, and then add a color pointer of the third type to a colored image corresponding to the selected thumbnail image.

According to an embodiment of the disclosure, by realizing types of a color pointer added on a sketch image, a color pointer to be deleted, and a color pointer added on a colored image to be distinguished from each other, the user may predict how the colored image is to be changed.

When the user selects the application menu 305 after the new color pointer 315*d* is added on the colored image 360, a new colored image (not shown) may be generated based on the newly added color pointer 315*d* of the third type and the color pointers 315*b*, 315*c*, and the like of the first type, which are added previously and not deleted.

Figure 9:
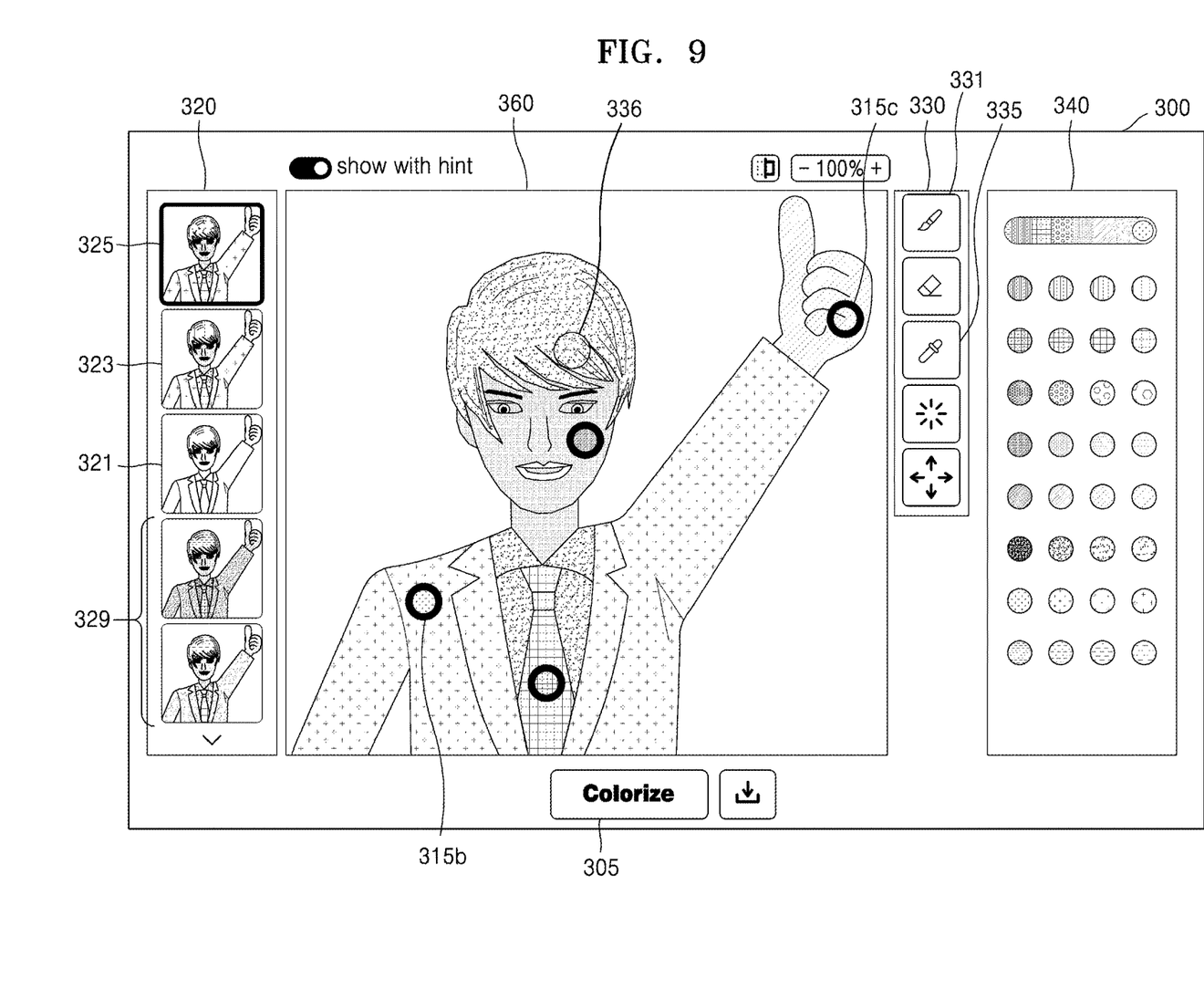
FIG. 9 is an exemplary diagram showing a UI screen when a color extraction menu is selected.

FIG. 9 is an exemplary diagram showing the UI screen 300 when a color extraction menu 335 is selected.

The color extraction menu 335 is used to assign a color included in the colored image 360 to a color of a color pointer. In detail, when the user selects the color extraction menu 335, an enlargement pointer 336 is displayed on the UI screen 300, and the user may select a color to be extracted while changing the location of the enlargement pointer 336.

When the user performs an input, such as mouse clicking, touching, or the like, while a partial region of the colored image 360 is enlarged and displayed by the enlargement pointer 336, the color of the partial region in the enlargement pointer 336 is selected from the color swatch 340. Then, the user selects the color pointer addition menu 331 and selects a desired point, thereby adding, on the colored image 360, the color pointer of the color of the partial region in the enlargement pointer 336. In other words, when it is difficult to select a desired color from the color swatch 340, the user may easily select the color of a color pointer by using a color included in the colored image 360.

Figure 10:
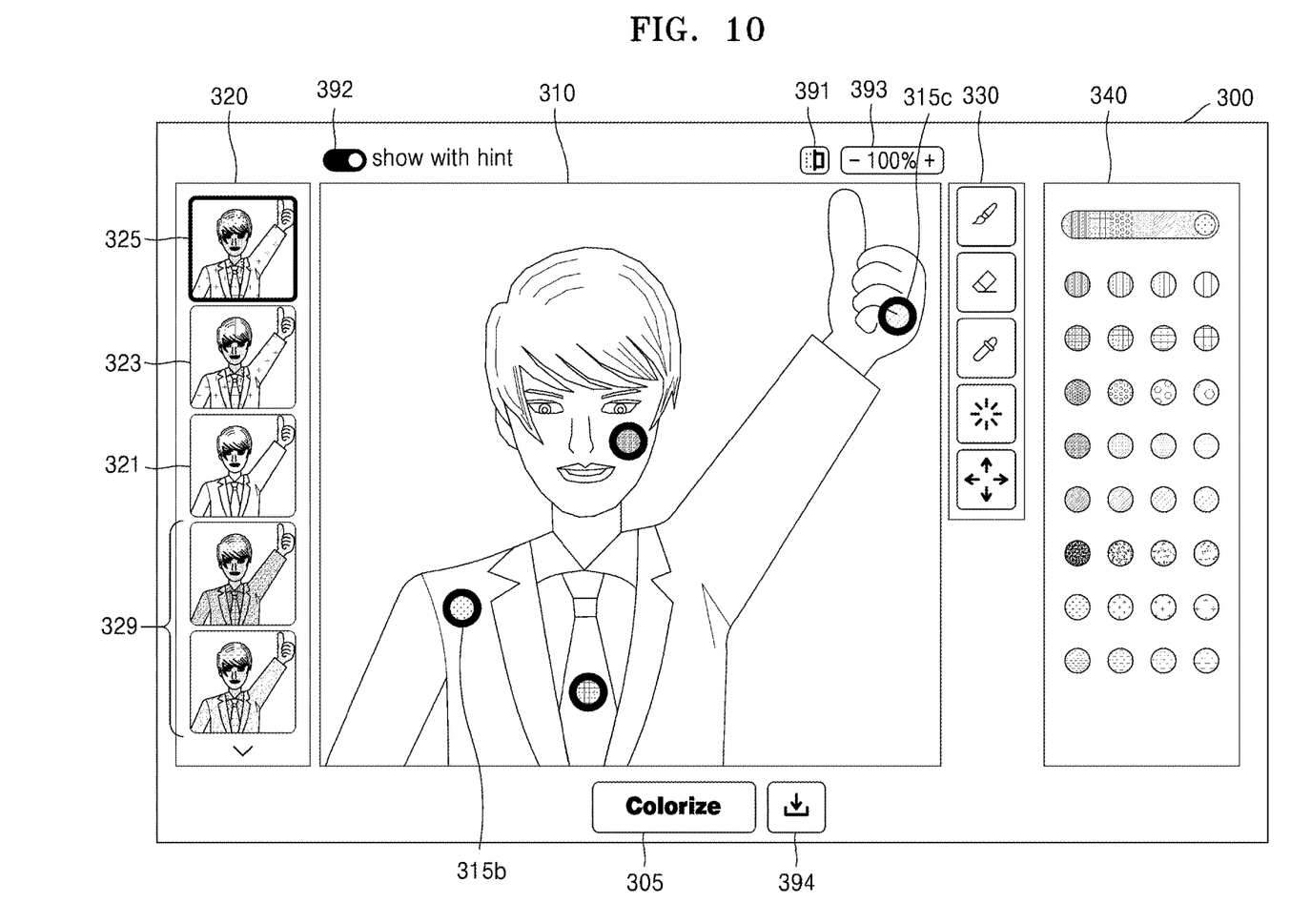
FIG. 10 is an exemplary diagram showing a UI screen when a color nonapplication menu is selected.

FIG. 10 is an exemplary diagram showing the UI screen 300 when a color nonapplication menu 391 is selected.

When the user selects the color nonapplication menu 391 while the colored image 360 is displayed on the UI screen 300, the sketch image 310 before being colored may be displayed on the UI screen 300. When the user selects the color nonapplication menu 391 again, the colored image 360 may be displayed on the UI screen 300. Referring to FIG. 10, even when the sketch image 310 is displayed instead of the colored image 360 as the user selects the color nonapplication menu 391, the color pointers 315*b*, 315*c*, and the like added by the user may be continuously displayed on the UI screen 300, but according to an embodiment, the color pointers 315*b*, 315*c*, and the like may also not be displayed on the UI screen 300.

Referring to FIG. 10, the UI screen 300 may further include a color pointer display menu 392, an enlargement/reduction menu 393, a download menu 394, and the like.

The color pointer display menu 392 is a menu for controlling display and non-display of the color pointers 315*b*, 315*c*, and the like located in the UI screen 300. When the user first selects the color pointer display menu 392, the color pointers 315*b*, 315*c*, and the like located in the UI screen 300 may not be displayed on the UI screen 300, and when the user selects the color pointer display menu 392 again, the color pointers 315*b*, 315*c*, and the like may be displayed again on the UI screen 300.

The enlargement/reduction menu 393 is a menu for adjusting the size of the sketch image 310 or the colored image 360.

The download menu 394 is a menu for downloading the sketch image 310 or the colored image 360, and for example, when the coloring apparatus 100 is a user terminal, the user terminal may store, in a memory, the sketch image 310 or the colored image 360, according to selection of the download menu 394 by the user. Also, for example, when the coloring apparatus 100 is a server, the server may transmit the sketch image 310 or the colored image 360 to the user terminal, according to selection of the download menu 394 by the user.

Figure 11:
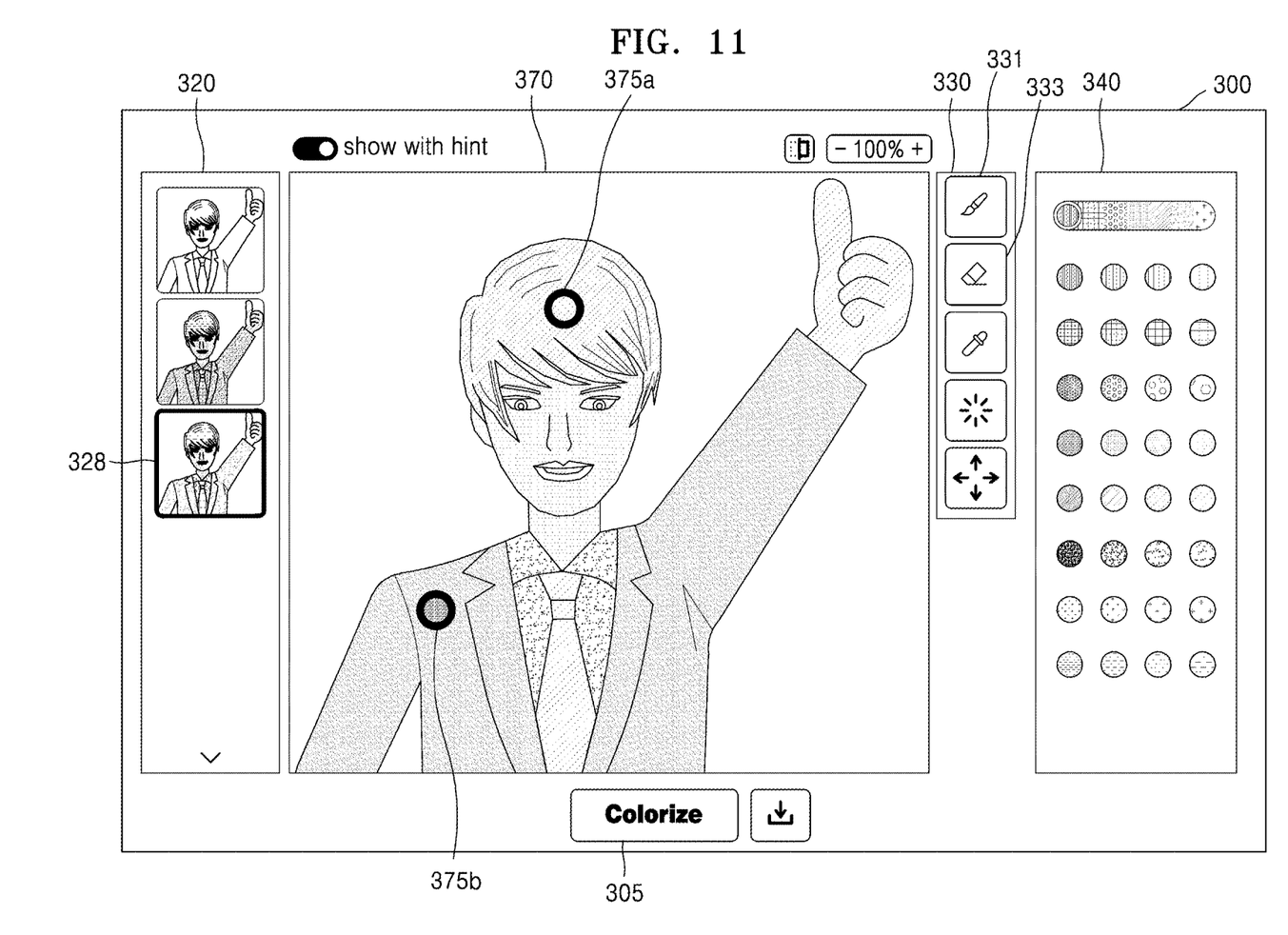
FIG. 11 is an exemplary diagram showing a UI screen when a thumbnail image of a sample colored image included in a history panel is selected.

FIG. 11 is an exemplary diagram showing the UI screen 300 when a thumbnail image 328 of a sample colored image 370 included in the history panel 320 is selected.

The user may change the sample colored image 370 by selecting the thumbnail image 328 of the sample colored image 370 included in the history panel 320. In detail, when one thumbnail image 328 is selected by the user, the sample colored image 370 corresponding to the selected thumbnail image 328 may be displayed on the UI screen 300. As shown in FIG. 11, color pointers 375*a* and 375*b* located on the sample colored image 370 may also be displayed on the UI screen 300.

The user may locate a new color pointer on the sample colored image 370 or delete the existing color pointers 375*a* and 375*b* via the color pointer addition menu 331 or the color pointer deletion menu 333, and generate a new colored image by selecting the application menu 305.

Figure 12:
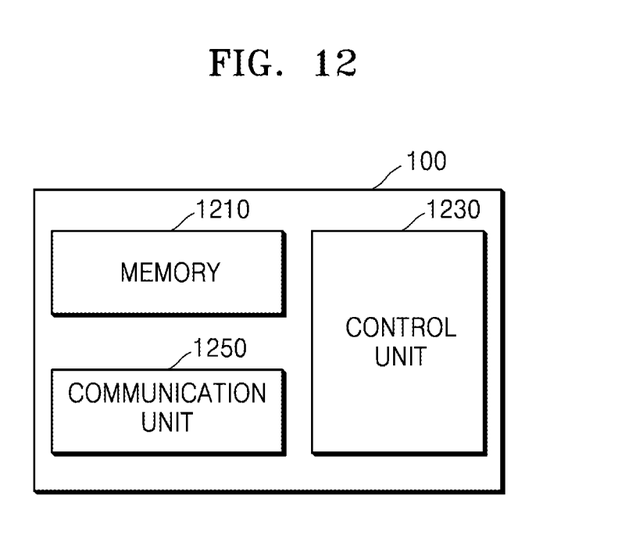
FIG. 12 is a block diagram of a configuration of a coloring apparatus, according to an embodiment.

FIG. 12 is a block diagram of a configuration of the coloring apparatus 100, according to an embodiment.

Referring to FIG. 12, the coloring apparatus 100 may include a memory 1210, a control unit 1230, and a communication unit 1250. The memory 1210, the control unit 1230, and the communication unit 1250 may be implemented as at least one processor.

The memory 1210 may store a program for coloring a sketch image. Also, the memory 1210 may further store a sketch image, a colored image, and a sample colored image.

The control unit 1230 may generate a UI screen for coloring a sketch image as the program stored in the memory 1210 is executed. The control unit 1230 may generate a colored image from the sketch image, according to manipulation of a user input via the UI screen 300. As described above, when the UI screen 300 is generated, the control unit 1230 may generate the sample colored image obtained by coloring the sketch image according to a pre-learned coloring method, and add a thumbnail image of the sample colored image to the UI screen 300, in detail, a history panel.

The communication unit 1250 communicates with another apparatus through a network. For example, the communication unit 1250 may receive a program for coloring a sketch image from the other apparatus. For example, the communication unit 1250 may transmit/receive a sketch image and/or a colored image to/from the other apparatus.

The embodiments of the disclosure described above may be written as computer-executable programs or instructions that may be stored in a recording medium.

The recording medium may continuously store the computer-executable programs, or temporarily store the computer-executable programs or instructions for execution or downloading. Also, the medium may be any one of various recording media or storage media in which a single piece or plurality of pieces of hardware are combined, and the medium is not limited to a medium directly connected to a computer system, but may be distributed on a network. Examples of the recording medium may include magnetic media, such as a hard disk, a floppy disk, and a magnetic tape, optical recording media, such as CD-ROM and DVD, magneto-optical media such as a floptical disk, and ROM, RAM, and a flash memory, which are configured to store program instructions. Other examples of the medium include recording media and storage media managed by application stores distributing applications or by websites, servers, and the like supplying or distributing other various types of software.

While one or more embodiments of the disclosure have been described with reference to the figures, it will be understood by those of ordinary skill in the art that various changes in form and details may be made therein without departing from the spirit and scope as defined by the following claims.

The invention claimed is:

1. A method, performed by a processor, of coloring a sketch image, comprising:
   adding a color pointer on the sketch image displayed on a user interface (UI) screen, according to an input of a user;
   determining an object related to a point where the color pointer is located, from among objects configuring the sketch image; and
   generating a colored image by coloring the determined object, based on a color of the color pointer and a color pre-set with respect to the determined object.

2. The method of claim 1, wherein the determined object includes the point where the color pointer is located, from among the objects.

3. The method of claim 1, further comprising:
   displaying the color pointer of a first type at a point selected by the user from the sketch image;
   changing the color pointer of the first type to a color pointer of a second type, according to a deletion request of the user; and
   changing the colored image, based on the color pointer of the second type.

4. The method of claim 3, wherein
   the color pointer of the first type comprises a first figure of a color selected by the user and a second figure of a pre-determined color, and
   the color pointer of the second type comprises the first figure in which transparency is adjusted and the second figure in which transparency is adjusted.

5. The method of claim 1, further comprising generating the user interface (UI) screen including the sketch image and a history panel,
   wherein the history panel comprises at least a thumbnail image of the colored image.

6. The method of claim 5, wherein the history panel further comprises a thumbnail image of the sketch image and a thumbnail image of a sample colored image corresponding to the sketch image.

7. The method of claim 5, further comprising displaying, on the UI screen, a colored image and a color pointer corresponding to a thumbnail image selected by the user from among a plurality of thumbnail images included in the history panel.

8. The method of claim 7, further comprising, according to a color pointer addition request of the user, locating the color pointer of a third type at a point selected by the user on the colored image corresponding to the thumbnail image selected by the user.

9. The method of claim 5, further comprising displaying, on the UI screen, the sketch image in a pre-determined size regardless of a resolution of the sketch image.

10. The method of claim 5, wherein the UI screen further comprises a tool menu, and
    the method further comprises:
    displaying, on the UI screen, an enlargement pointer for enlarging a partial region of the colored image;
    recognizing a color of a partial region selected by the enlargement pointer; and
    according to a color pointer addition request of the user, locating a color pointer of the recognized color on the colored image.

11. The method of claim 5, wherein the UI screen further comprises a color swatch for selecting a color of the color pointer.

12. A non-transitory computer readable recording medium storing a program for enabling a processor to execute the method of claim 1.

13. An apparatus for coloring a sketch image, comprising:
    a processor; and
    a memory storing at least one instruction for enabling the processor to,
    add a color pointer on the sketch image displayed on a user interface screen, according to an input of a user;
    determine an object related to a point where the color pointer is located, from among objects configuring the sketch image; and
    generate a colored image by coloring the determined object, based on a color of the color pointer and a color pre-set with respect to the determined object.

14. A method, performed by a processor, of coloring a sketch image, comprising:
    adding a color pointer on the sketch image displayed on a user interface (UI) screen, according to an input of a user;
    determining an object related to a point where the color pointer is located, from among objects configuring the sketch image;

generating a colored image by coloring the determined object, based on a color of the color pointer;

adding a thumbnail image of the colored image to a history panel; and displaying, on the UI screen, a colored image and a color pointer corresponding to a thumbnail image selected by the user from among a plurality of thumbnail images included the history panel.

* * * * *